(12) United States Patent
Rabinovich et al.

(10) Patent No.: US 6,881,386 B2
(45) Date of Patent: Apr. 19, 2005

(54) LOW CURRENT PLASMATRON FUEL CONVERTER HAVING ENLARGED VOLUME DISCHARGES

(75) Inventors: Alexander Rabinovich, Swampscott, MA (US); Nikolai Alexeev, Moscow (RU); Leslie Bromberg, Sharon, MA (US); Daniel R. Cohn, Chestnut Hill, MA (US); Andrei Samokhin, Moscow (RU)

(73) Assignee: Massachusetts Institute of Technology, Cambridge, MA (US)

( * ) Notice: Subject to any disclaimer, the term of this patent is extended or adjusted under 35 U.S.C. 154(b) by 426 days.

(21) Appl. No.: 10/158,615

(22) Filed: May 30, 2002

(65) Prior Publication Data

US 2003/0221949 A1 Dec. 4, 2003

(51) Int. Cl.[7] ................................................ B01J 19/08
(52) U.S. Cl. ............................ 422/186.04; 422/186.22; 422/186.25; 422/186.28; 123/3
(58) Field of Search ....................... 422/186.04, 186.22, 422/186.25, 186.28; 123/3

(56) References Cited

U.S. PATENT DOCUMENTS

| | | | |
|---|---|---|---|
| 2,787,730 A | 4/1957 | Berghaus et al. | 315/111 |
| 3,018,409 A | 1/1962 | Berghaus et al. | 315/111 |
| 3,035,205 A | 5/1962 | Berghaus et al. | 315/111 |
| 3,423,562 A | 1/1969 | Jones et al. | 219/121 |
| 3,649,195 A | 3/1972 | Cook et al. | 23/209.4 |
| 3,879,680 A | 4/1975 | Naismith et al. | 331/94.5 |
| 3,992,277 A | 11/1976 | Trieschmann et al. | 204/172 |
| 4,059,416 A | 11/1977 | Matovich | 48/197 |
| 4,339,546 A | 7/1982 | Randalls | 518/704 |
| 4,625,681 A | 12/1986 | Sutekiyo | 123/3 |
| 4,830,492 A | 5/1989 | Ko | 356/313 |
| 4,963,792 A | 10/1990 | Parker | 315/58 |
| 4,967,118 A | 10/1990 | Urataki et al. | 315/56 |
| 5,095,247 A | 3/1992 | Hanamura | 315/111.21 |
| 5,138,959 A | 8/1992 | Kulkarni | 110/346 |
| 5,425,332 A | 6/1995 | Rabinovich et al. | 123/3 |
| 5,437,250 A | 8/1995 | Rabinovich et al. | 123/3 |
| 5,560,890 A | 10/1996 | Berman et al. | 422/186.04 |
| 5,653,895 A | 8/1997 | Shintani | 219/121.5 |
| 5,887,554 A | 3/1999 | Cohn et al. | 123/3 |
| 6,012,326 A | 1/2000 | Raybone et al. | 422/186.21 |
| 6,284,157 B1 | 9/2001 | Eliasson et al. | 252/373 |
| 6,322,757 B1 | 11/2001 | Cohn et al. | 422/186.04 |

FOREIGN PATENT DOCUMENTS

| | | |
|---|---|---|
| EP | 0 423 370 | 4/1991 |
| EP | 0 605 010 | 7/1994 |
| WO | WO 01/33056 | 5/2001 |

*Primary Examiner*—Kishor Mayekar
(74) *Attorney, Agent, or Firm*—Choate, Hall & Stewart

(57) ABSTRACT

A novel apparatus and method is disclosed for a plasmatron fuel converter ("plasmatron") that efficiently uses electrical energy to produce hydrogen rich gas. The volume and shape of the plasma discharge is controlled by a fluid flow established in a plasma discharge volume. A plasmatron according to this invention produces a substantially large effective plasma discharge volume allowing for substantially greater volumetric efficiency in the initiation of chemical reactions within a volume of bulk fluid reactant flowing through the plasmatron.

40 Claims, 8 Drawing Sheets

LOW CURRENT PLASMATRON FUEL CONVERTER HAVING ENLARGED VOLUME DISCHARGES

GOVERNMENT SUPPORT

This invention was made with government support under Grant Nos. DE-AC03-99EE50565 and DE-FG04-95AL88002, awarded by the Department of Energy. The United States Government has certain rights in the invention.

FIELD OF THE INVENTION

The present invention relates to a method and apparatus for a plasma fuel converter and more particularly to a low current plasmatron fuel converter having enlarged volume discharges.

BACKGROUND OF THE INVENTION

Plasmatron fuel converters reform hydrocarbons to generate a hydrogen rich gas through the use of plasma discharges. (See, for example, U.S. Pat. Nos. 6,322,757 and 5,887,554, the teachings of which are incorporated herein by reference). Two general types of plasma discharge regimes can be distinguished by their electrical characteristics and their modes of operation. A non-arcing discharge regime operates at high voltage and low currents, while an arc discharge regime operates at low voltage and high currents. (For a general treatise, see J. Reece Roth, Industrial Plasma Engineering, Vol. 1 and 2, Institute of Physics: Bristol, UK, 1995).

Thermal arc plasmatrons have received particular attention in the prior art. (See, for example, U.S. Pat. Nos. 5,425,332 and 5,437,250, the teachings of which are incorporated herein by reference). These thermal arc plasmatrons operate at low voltage and high current and, therefore, have relatively inefficient electrical power to chemical power conversion ratios. Better electrical power to chemical power conversion ratios, as well as lower current resulting in lower electrode erosion, can be obtained through the use of non-arcing discharge plasmatrons. However, non-arcing discharges are usually operable at sub-atmospheric pressure, typically less than about 20 Torr. When pressure is increased, the non-arcing discharge rapidly transitions to an arc discharge. Low pressure gas glow discharges and apparatus for their production are known. (See, for example, U.S. Pat. Nos.: 2,787,730; 3,018,409; 3,035,205; 3,423,562; 4,830,492; 4,963,792; and 4,967,118, the teachings of which are incorporated herein by reference). However, the effective volumetric flow rates through these low pressure devices are limited.

It is desirable to have a plasma converter that produces discharges in the non-arcing regime in a substantially continuous manner with a substantially enlarged effective discharge volume.

SUMMARY OF THE INVENTION

A novel apparatus and method is disclosed for a plasmatron fuel converter ("plasmatron") that efficiently uses electrical energy to produce hydrogen rich gas. The volume and shape of the plasma discharge is controlled by a fluid flow established in a plasma discharge volume. A plasmatron according to this invention produces a substantially large effective plasma discharge volume allowing for substantially greater volumetric efficiency in the initiation of chemical reactions within a volume of bulk fluid reactant flowing through the plasmatron.

In one aspect, the invention is a plasmatron fuel converter comprising a first electrode and a second electrode separated from the first electrode by an electrical insulator and disposed so as to create a gap with respect to the first electrode so as to form a discharge volume adapted to receive a fuel/air mixture. A power supply is connected to the first and second electrodes and adapted to provide voltage and current sufficient to generate a plasma discharge within the discharge volume. Fluid flow is established in the discharge volume so as to stretch and deform the plasma discharge.

BRIEF DESCRIPTION OF THE DRAWING

The invention is described with reference to the several figures of the drawing, in which.

DETAILED DESCRIPTION OF THE INVENTION

Figure 1:
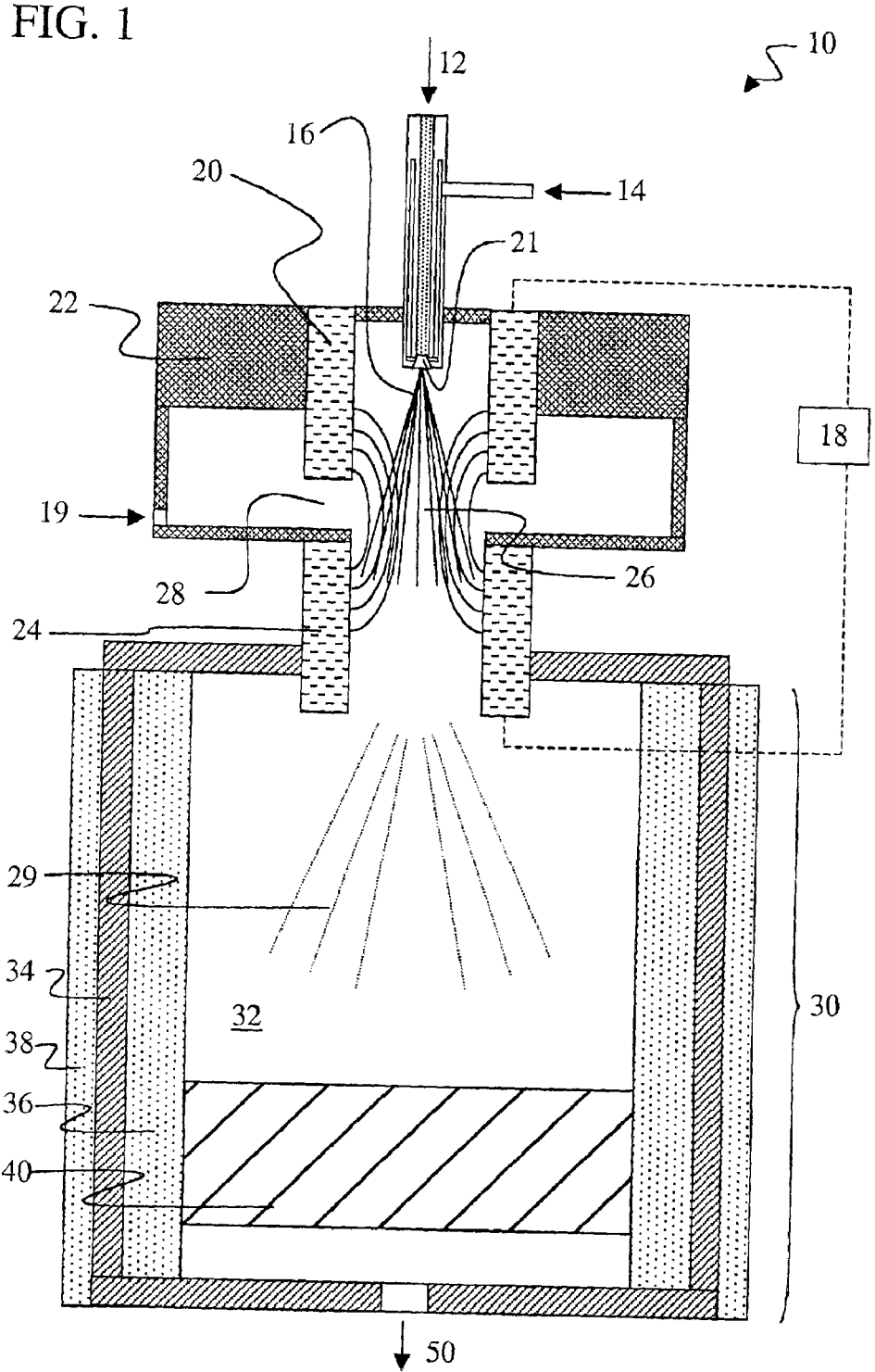
FIG. 1 is a cross-sectional view of a low current, low power plasmatron fuel converter according to one embodiment of the invention.

Robust, large volume plasma discharges are needed for fast start-up of low current, low power plasmatron fuel converters ("plasmatrons") and for efficient operation after start-up. Efficient operation requires both the efficient use of electrical energy to promote chemical reactions in a given discharge volume and volumetric efficiency in the percentage of chemical conversion achieved in the volume of bulk reactant fluid. Such efficient operation has been achieved by the present invention through the use of a plasmatron having a special configuration which utilizes a low current plasma discharge that is continually stretched and extinguished by flowing gas and is then quasi-instantly and randomly reestablished elsewhere in the discharge volume. Importantly, the chemical effects of the active species flux in the region of the bulk fluid local to an extinguished discharge typically persist for a much greater period than the cycle period of an individual plasma discharge. This continual and rapid displacement of the discharge from one path in the discharge region to another covers both a relatively large area perpendicular to the flow of injected reactant fluids and a significant distance along the flow. Rapid establishment, extinction and reestablishment of the plasma discharges, combined with initiation of persistent chemical reactions by the flux of active species generated by the discharge, result in a quasi-continuous plasma discharge. The quasi-continuous plasma discharge effectively fills the discharge volume and initiates chemical reactions throughout that volume.

The efficiency of the plasmatron in use of electrical energy to promote hydrogen producing reactions is determined, in part, by the ratio of the period of operation in the non-arcing discharge regime to the total period of plasma discharge during an average cycle of operation. Thus, the plasmatron of this invention can operate in a substantially continuous manner in the non-arc discharge regime.

One preferred embodiment of the invention is as a fast starting, low current, low power enlarged volume plasmatron. One application involves partial oxidation of hydrocarbon fuels to produce hydrogen rich fuels for use in internal combustion systems such as gasoline or diesel engines and their associated exhaust systems. Such plasmatrons may be selected for operation between stoichiometric partial oxidation and full combustion depending on conditions and applications. During full combustion, the output of the plasmatron is a hot gas that is no longer hydrogen-rich. Operation in full combustion is generally only maintained for brief periods. Power for operation of the plasmatron will preferably be provided by components of the internal combustion system.

Referring now to the figures of the drawing, the figures constitute a part of this specification and illustrate exemplary embodiments to the invention. It is to be understood that in some instances various aspects of the invention may be shown exaggerated or enlarged to facilitate an understanding of the invention.

FIG. 1 is a cross-sectional view of one embodiment for a low current, low power plasmatron 10. In a preferred embodiment, fuel 12 and oxidant (e.g. air) 14 are supplied to the plasmatron 10 to form a fuel-air mixture 16. Alternatively, the reactive mixture 16 supplied to the plasmatron 10 may comprise only atomized fuel (without oxidant). In a preferred embodiment that maximizes volume and minimizes electrode wear, the plasmatron is comprised of a top cylindrical electrode 20 and a bottom cylindrical electrode 24 separated by an electrical insulator 22. This cylindrical geometry minimizes average current density and associated erosion on the surface of both electrodes 20, 24. Inadvertent or excessive operation in the arc discharge regime, and its associated wear on the surface of the electrodes 20, 24, may be minimized by including a current limiting feature in a high voltage power supply 18 attached to the electrodes 20, 24. The electrodes 20, 24 are axially aligned with the longitudinal axis of the plasmatron 10 allowing for a gap in between them to form a plasma discharge volume 26 by at least two boundaries. An additional fluid flow (e.g. air or a fuel/air mixture) 19 is introduced into the plasma discharge volume 26 with a tangential component to produce a flow that stretches, deforms and moves poloidally the discharge. This plasma shaping air (or air/fuel) 19 may be established by one or more apertures (or channels) 28 between the top and bottom electrodes. These apertures may be designed to provide a vorticity to the plasma shaping air as it flows through the plasma discharge volume 26.

In one embodiment, the flow of the fuel/air mixture 16 and the flow of the plasma shaping air 19 are perpendicular to one another. Establishing the flows in this manner through the discharge volume maximizes the effective volume of the bulk fuel/air mixture 16 and plasma shaping air 19 that interact with the volume of active species from the plasma discharges. These active species are within each plasma discharge and within the regions of the bulk fuel/air mixture 16 local to each plasma discharge. This geometry can provide continual initiation of the partial oxidation reactions at all sub-volumes of plasma discharge volume 26 radial to the axis of the flow of the fuel/air mixture 16. The relatively long paths of plasma discharges along the main direction of flow ensures adequate reaction initiation at multiple radial and axial positions, thus assuring efficient ignition. Where conditions, such as low oxygen/fuel ratios, limit the persistence and propagation of partial oxidation reactions (i.e. limited or quenched "flame" or "ignition" propagation), reaction initiation at multiple radial and axial positions along the axis of flow ensures reaction initiation in the fuel/air mixture 16 throughout the plasma discharge volume 26.

In a preferred embodiment, the liquid fuel 12 is atomized and introduced from the center of the top electrode 20. Fuel atomization can be achieved by appropriate nozzle 21 design, with or without air assist. When operating with liquid hydrocarbons, fuel deposition and condensation on the inner surfaces of electrodes 20, 24 may be reduced by employing the nozzle 21 to produce a narrow jet of fuel droplets. Spray angles between 15 and 30 degrees have been shown to be sufficient.

The plasma discharge is established by supplying high voltage (300 V to 60 kV) (and resulting current in the range of approximately 10 milliamperes to 2 amperes) in the discharge volume 26 between electrodes 20, 24. The plasma shaping air 19 is injected from a side aperture 28 in such a way as to create shear and displacement stresses that deform and displace the volume of the plasma discharge (and plasma sheath, if any) and mix the the fuel/air mixture 16 with the plasma discharge. The stresses stretch and deform the discharge, thus affecting the electrical and thermal characteristics of the plasma. If stretched beyond a critical length, the plasma's electrical field becomes unsustainable. Whether in thermodynamic equilibrium or non-equilibrium, the low current non-arcing discharge is eventually elongated to the point of extinction due to current limitation, voltage limitation or geometric plasma instability.

The plasma discharge is reestablished almost instantaneously along a different pathway between two random points on the electrodes 20, 24. The plasma discharge is generally restablished in a time of less than 100 nanoseconds. Depending on the selections of various operational parameters of the plasmatron, this process occurs naturally at a high frequency of plasma discharge initiation and extinction and provides quasi-uniform plasma discharge throughout the entire volume of the discharge region. The frequency of plasma discharge initiation and extinction is here termed 'cycle frequency'. Natural cycle frequency for a plasmatron fuel converter of the illustrated preferred embodiment will typically be on the order of several kHz (1–10 kHz). Since the chemical reactions initiated by each individual discharge persist and propagate in the region of the bulk fuel/air mixture 16 local to the discharge for a significant time after the extinction of the discharge, the effect of the quasi-uniform, 'volumetric' plasma discharge is to produce a volumetric initiation ('volumetric ignition') of chemical reactions throughout the bulk fuel/air mixture 16.

Generally, the plasmatron will provide average power to the plasma in range of between 10 and 1000 watts. The electrical power consumption is generally between 0.3% to 10% of the thermal power content of the hydrogen rich gas produced by the plasmatron.

The cycle frequency necessary to provide a quasi-uniform plasma discharge can be provided by the selection of various electrical and fluid dynamic characteristics of the plasmatron as described above. Generally, the power supply frequency will be adjusted in the range of 100 Hz to 2 MHz. By controlling the electrical and thermodynamic parameters of the plasma, the operation of this plasmatron fuel converter can be selected for high energy conversion efficiency and for selectivity in the chemical processes initiated by the volumetric ignition. In the preferred embodiment of the invention, such selectivity is for the production of hydrogen gas from hydrocarbon fuel.

The combination of volumetric ignition and high turbulence of the fuel/air stream is a very important feature of fast start fuel reforming. The enlarged volumetric discharge maximizes plasma and fuel/air mixture 16 contact and ensures initiation of the reaction throughout this mixture. By careful selection of the operating parameters of the air 14 and the fuel 12, and with the turbulence provided by the plasma and the fluid flow, the conditions for optimal chemical reactions are achieved. The air-fuel ratio, and thus the oxygen—carbon (O/C) ratio, can be varied from as low as an O/C ratio=1 for stoichiometric partial oxidation to as high as an O/C ratios=2 for liquid hydrocarbon fuels with a composition of $(CH_2)_n$, and preferably the O/C ratio will be in the range of 1.0 to 1.2. The volumetric ignition feature of the present application is very useful in achieving high volumetric efficiencies and high electrical efficiencies under conditions of reduced chemical reaction persistence and/or propagation. Such conditions occur in very fuel rich environments characteristic of partial oxidation reformation of hydrocarbon fuel, where chemical initiation at any individual site in the discharge volume is difficult to initiate and maintain because of very slow 'flame' propagation speed.

Following quasi-uniform volumetric ignition in the discharge region, an ignited fuel/air stream 29 is introduced into a reactor 30 having a reaction extension cylinder or region 32. The reactor 30 includes a steel tube 34 with inner thermal insulation 36 and outer thermal insulation 38. The reactor 30 may have a catalytic structure 40 at the bottom. The preferable catalytic structure 40 is a ceramic or metallic honeycomb support coated with rare metals (e.g. Pt, Pd). The honeycomb configuration has a low thermal mass which facilitates fast start.

In a preferred embodiment, the reaction extension region 32 provides a gap between the exit of the bottom electrode 24 and the catalytic structure 40. This gap is necessary for fuel droplets vaporization and production of a homogenous mixture ready for reforming on the catalyst surface, and to control temperature of the catalyst. The length of the reaction extension region gap should be greater than 1 cm, and preferably greater than 10 cm. In order to achieve higher productivity of output hydrogen rich gas 50, it is possible to inject additional fuel/air mixture 16 into the reaction extension region 32.

Figure 2:
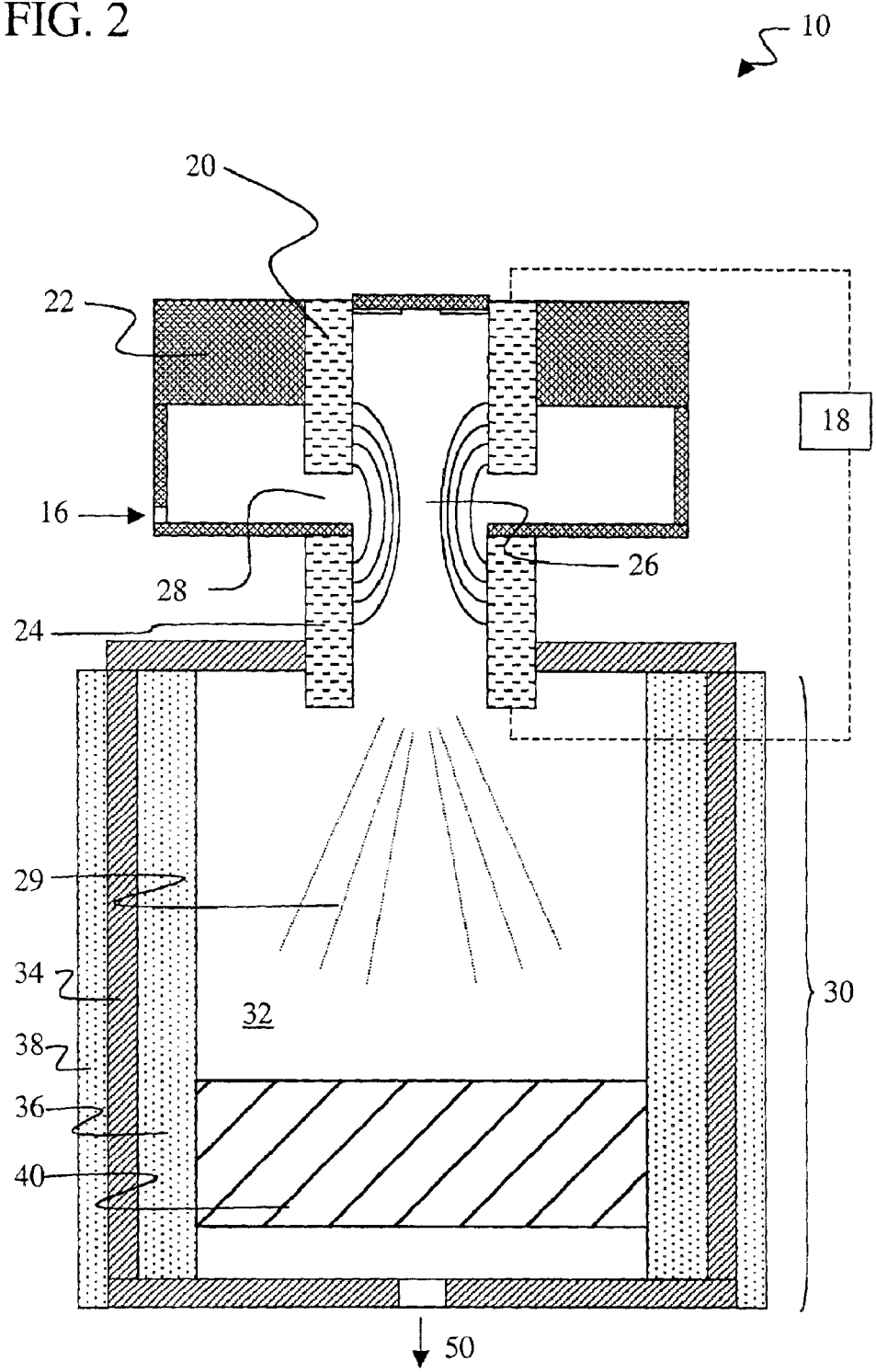
FIG. 2 is a cross-sectional view of a plasmatron fuel converter illustrating a combined flow of a fuel/air mixture and plasma shaping air.

FIG. 2 is a cross-sectional view of an embodiment of the plasmatron fuel converter 10 showing the addition of a fuel/air mixture by injection into the plasma discharge volume between electrodes 20, 24. In this variant of the invention, all fuel is vaporized and then introduced as a fuel/air vapor mixture 16 into the discharge region 26 through the side opening 28 between the electrodes 20, 24. This embodiment could also be used for gaseous hydrocarbon fuels reformation. Thus, the injection of the fuel/air mixture 16 can provide the reactive mixture while also shaping the plasma discharge.

Figure 3:
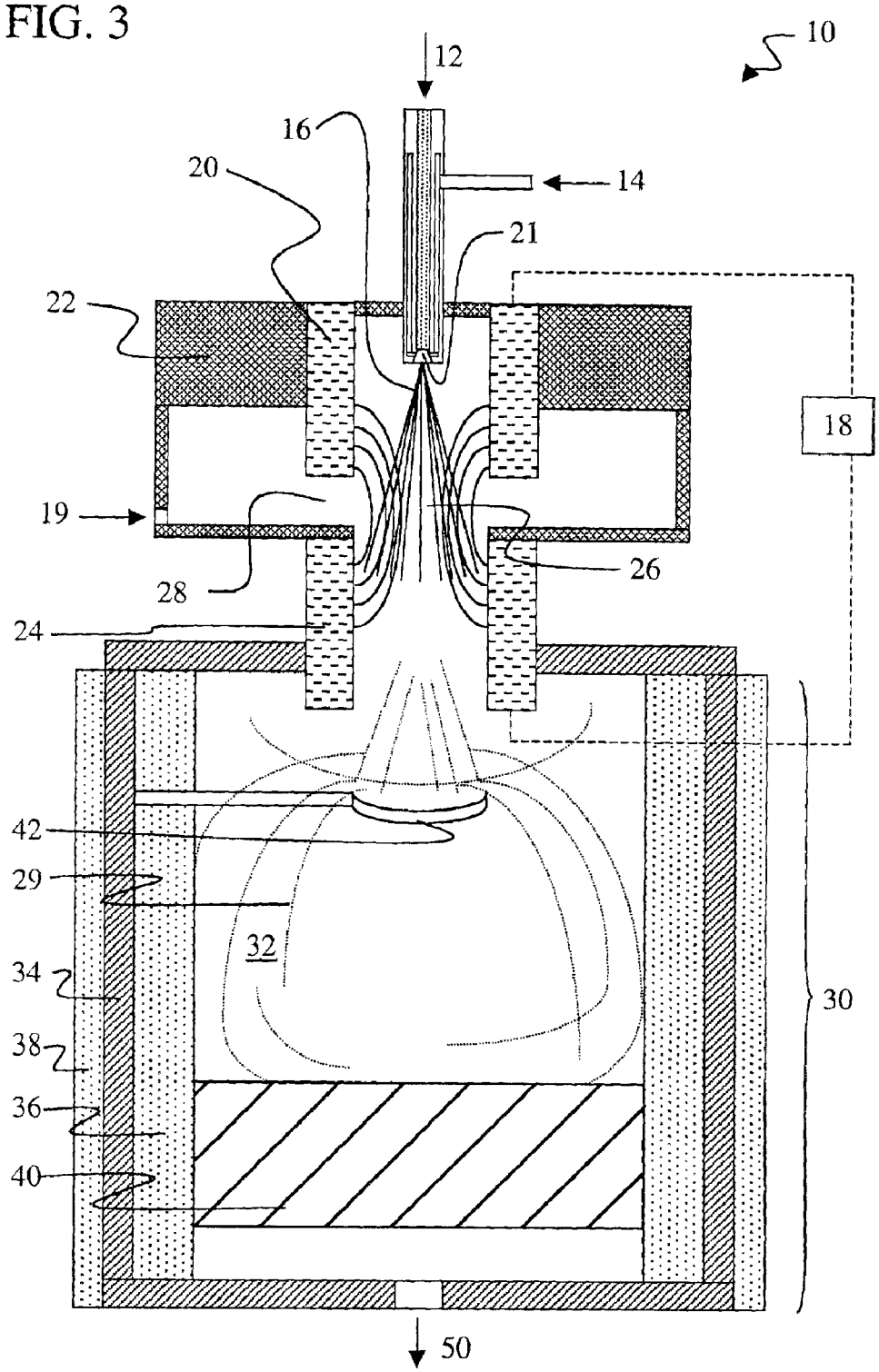
FIG. 3 is a cross-sectional view of a plasmatron fuel converter with a turbulizer according to one embodiment of the invention.

FIG. 3 is a cross-sectional view of an embodiment of the plasmatron fuel converter 10 showing the use of a turbulizer 42 to shorten start-up time and increase the heat and mass transfer capacity of the reactor 30. The turbulizer 42 deflects the hot, ignited fuel/air stream 29 coming from the bottom electrode 24 to the cold walls of the reactor 30. By heating the cold walls with the ignited fuel/air stream 29, the temperature gradient across the reactor is decreased resulting in increased efficiency and a faster start-up time. Also, the turbulizer's 42 hot surface helps to vaporize any remaining liquid fuel droplets in the ignited fuel/air stream 29. In a preferred embodiment, the turbulizer 42 is made of steel.

Figure 4:
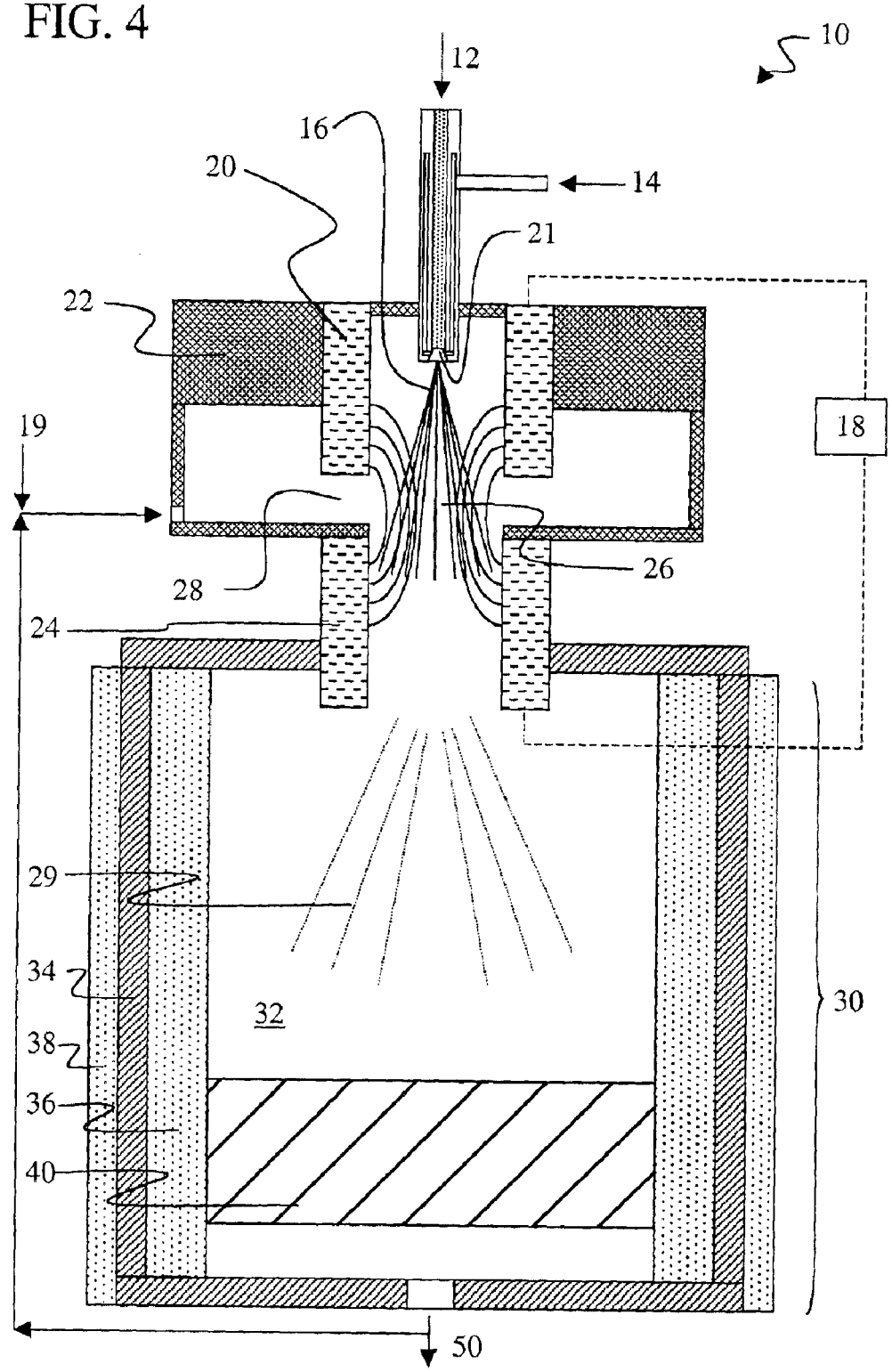
FIG. 4 is a cross-sectional view of a plasmatron fuel converter showing the use of hot recirculated hydrogen rich gas according to one embodiment of the invention.

FIG. 4 is a cross-sectional view of an embodiment of the plasmatron fuel converter 10 in which, to further decrease the start up time, part of the hot hydrogen rich gas 50 reformate output from the plasmatron is recirculated back into the plasmatron 10, potentially premixed with the plasma shaping air 19. In other embodiments, the recirculated hydrogen rich gas ouput may be mixed with the fuel/air mixture. Hydrogen rich gas 50 recirculation increases the ease of the reforming operation, due to the much greater volumetric ignition rate ('flame speed') of the hydrogen. In this configuration, the equilibrium of the reformats is not changed, but the kinetics of the partial oxidation reaction could be dramatically increased. The hot recirculated hydrogen rich gas 50 can also help in quickly raising the temperature needed for start-up.

Figure 5:
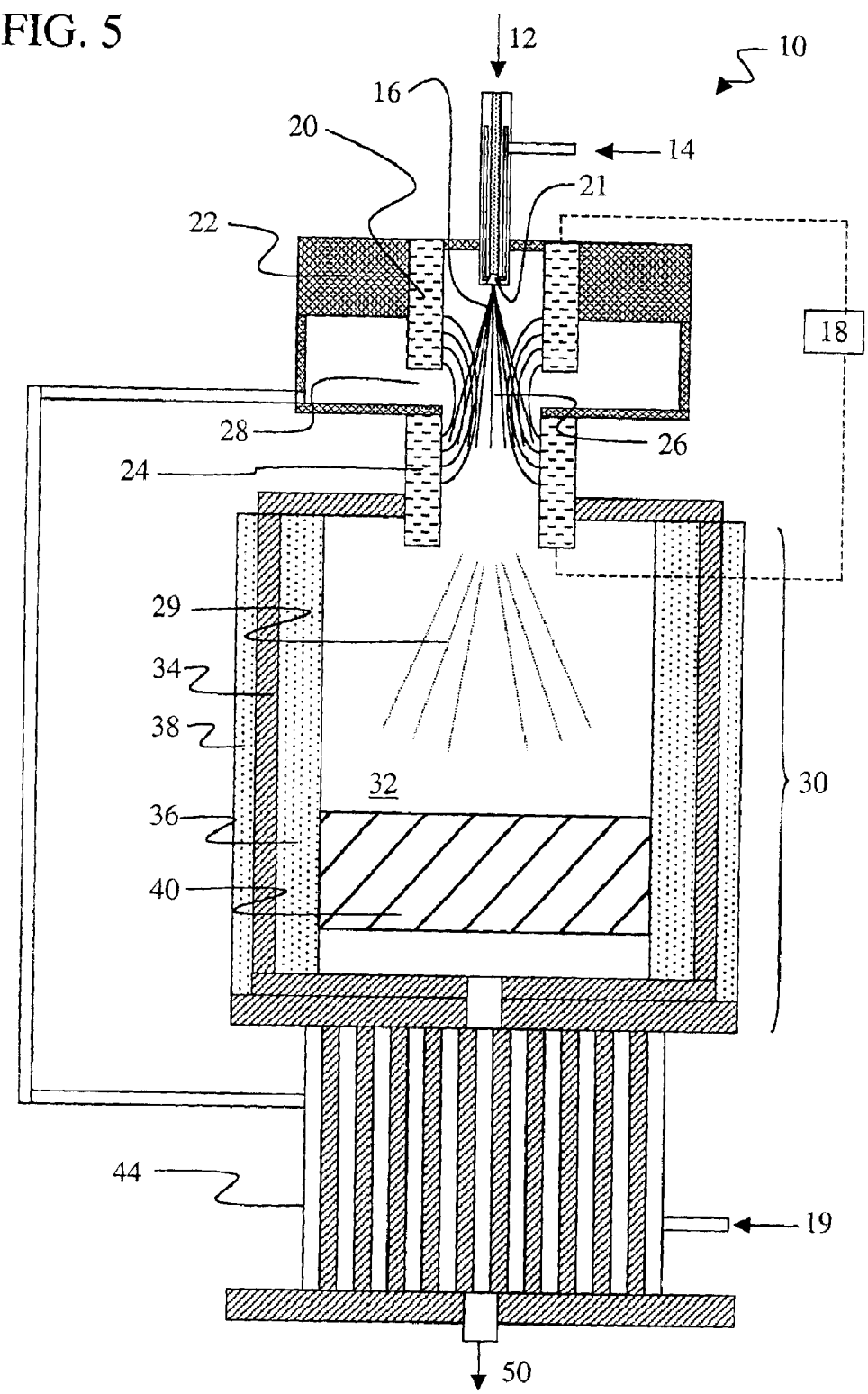
FIG. 5 is a cross-sectional view of a plasmatron fuel converter with a heat exchanger according to one embodiment of the invention.

FIG. 5 is a cross-sectional view of an embodiment of the plasmatron fuel converter 10 wherein following the fast start period, the energy consumption could be decreased by using a heat exchanger 44 to preheat the plasma shaping air 19. In other embodiments, the heat exchanger may be used to preheat the air 14, the fuel 12, and the fuel/air mixture 16. The heat exchanger 44 allows for decreasing the temperature of the hydrogen rich gas 50 injected into an engine's inlet manifold. Also by preheating air 14 in the counter flow heat exchanger 44 it is possible to decrease power of plasmatron necessary to reform the fuel 12 at a given fuel flow rate. Alternatively at a constant level of plasmatron power the heat exchanger 44 makes it possible to reform a higher flow rate of fuel 12.

It is recognized that selection of various geometries of electrode configurations and various geometries of introducing fuel and air into the plasma discharge volume will provide various conversion efficiencies and chemical selectivity. Without limitation, embodiments of alternative electrode configurations include: two parallel ring electrodes with a gap disposed between; two parallel rod electrodes with a gap disposed between; and a first cylindrical electrode co-axially disposed in a second cylindrical electrode which has a cylindrical inner bore of greater diameter than the outer diameter of the first electrode.

Figure 6A:
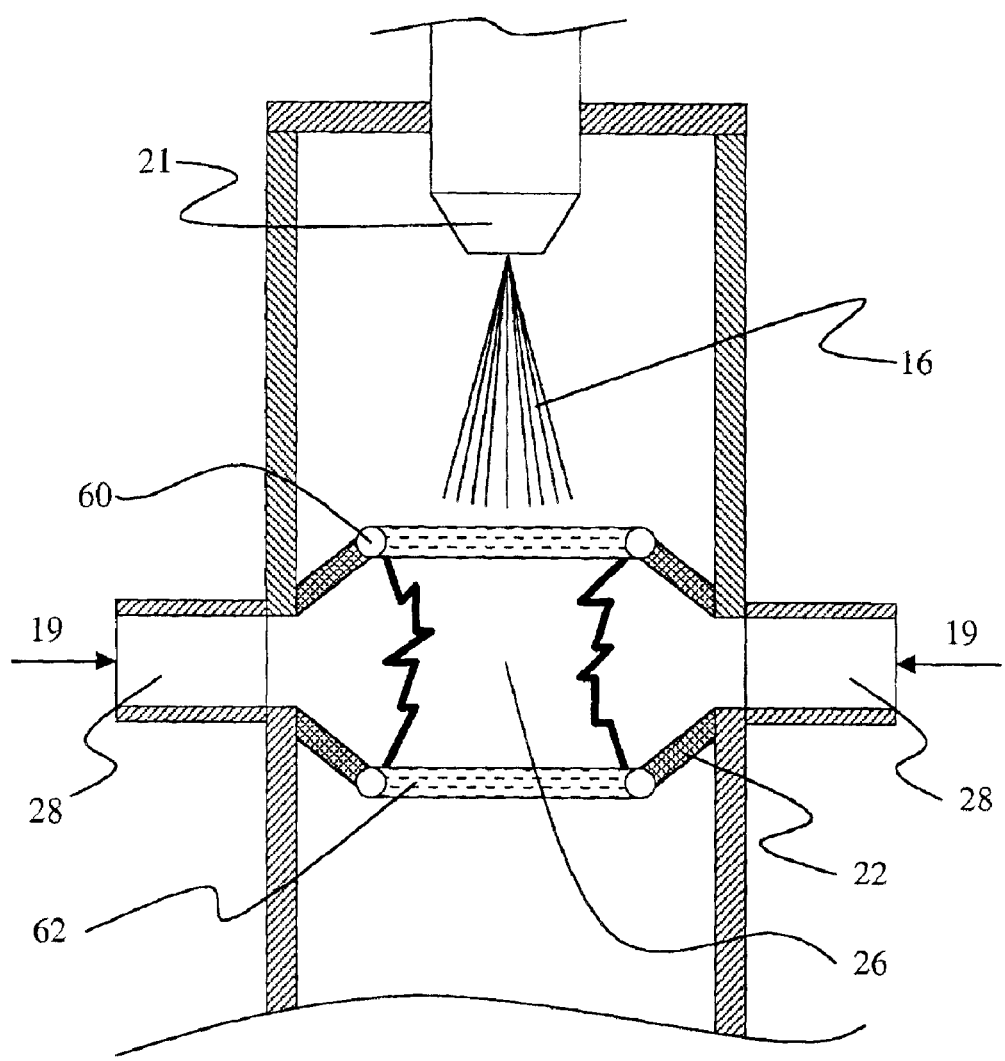
FIGS. 6A–6C are cross-sectional views of multiple electrode configurations according to multiple embodiments of the invention.
Figure 6B:
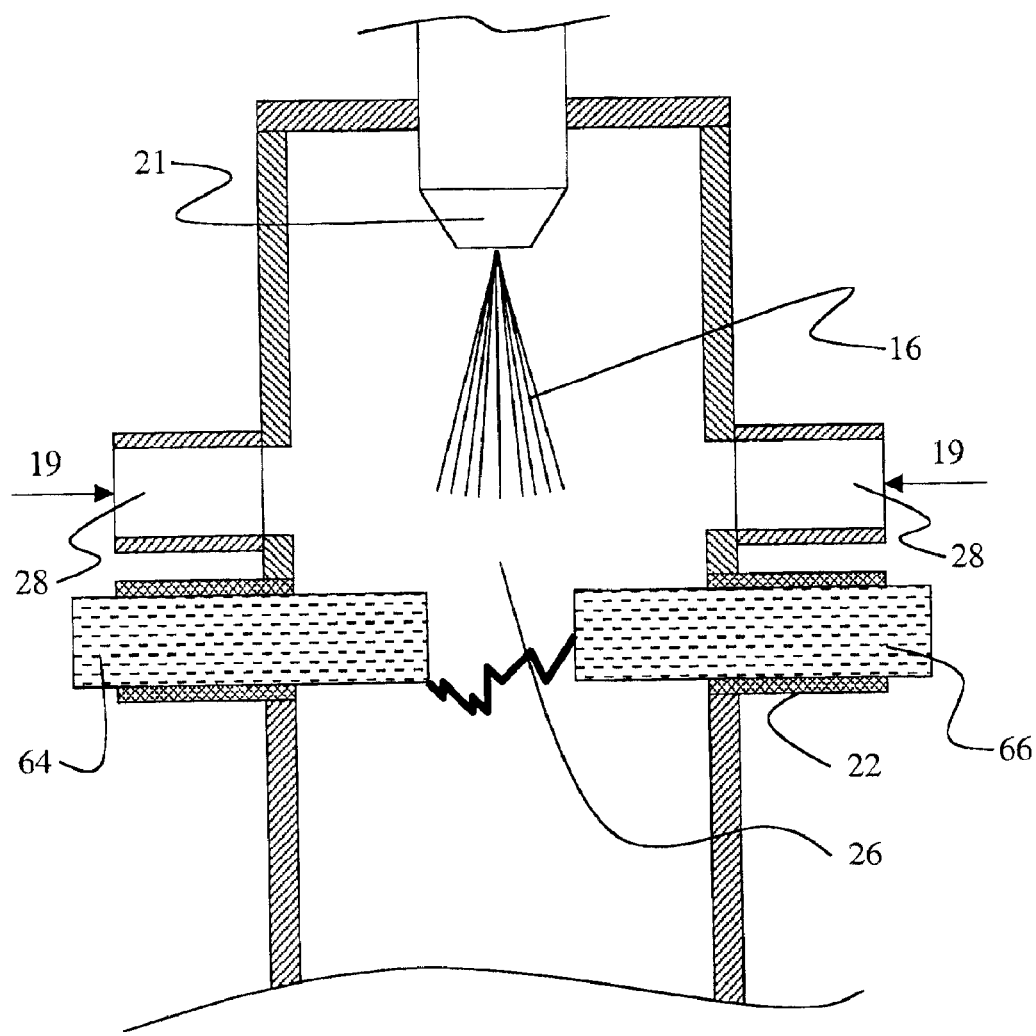
Figure 6C:
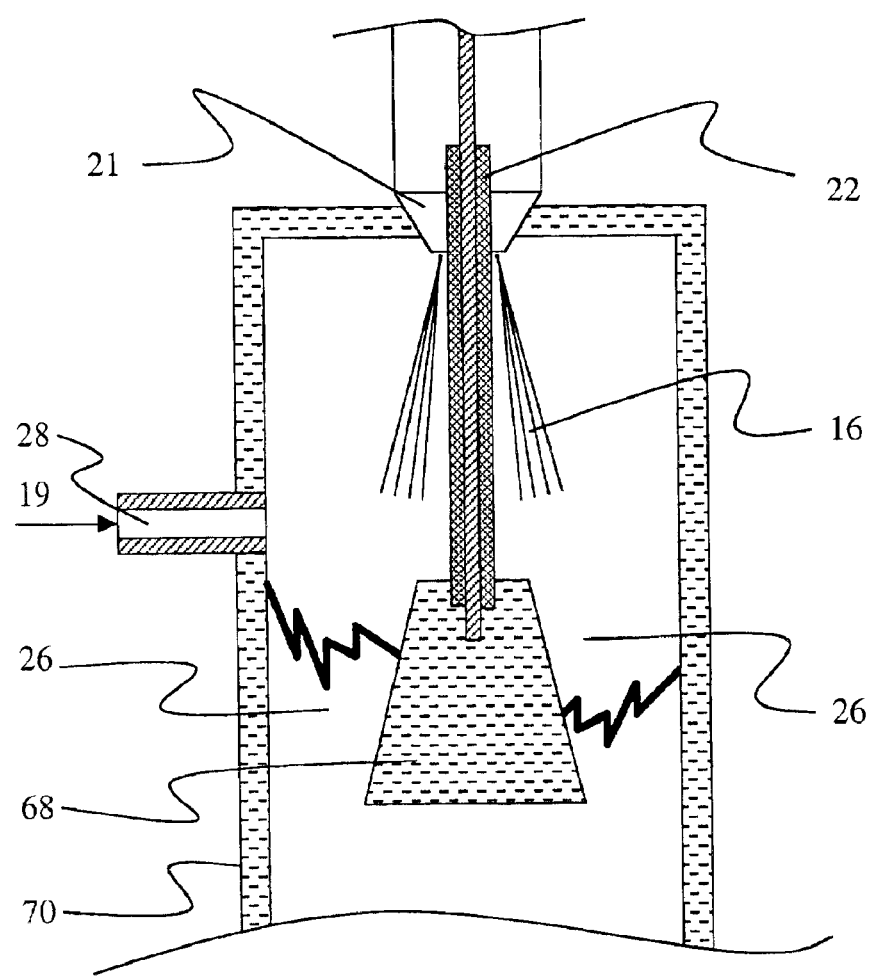

FIGS. 6A–6C are cross-sectional views of multiple electrode configurations according to multiple embodiments of the invention. FIG. 6A illustrates the use of ring electrodes 60 and 62 positioned in a vertical configuration. Fuel or fuel/oxidant mixture 16 is injected from nozzle 21 through the top ring electrode 60 and into the plasma discharge volume 26 defined by top and bottom ring electrodes 60 and 62 where the electrodes supply a voltage to generate the plasma discharge. The electrodes 60 and 62 are electrically separated by insulator 22. Plasma shaping air 19 is injected from one or more apertures 28 which may be located at multiple circumferential positions.

FIG. 6B illustrates a rod-to-rod electrode configuration in which the rod electrodes 64 and 66 are positioned in a horizontal configuration. The operation of the system is generally similar to that of other embodiments in that a fuel/air mixture 16 is injected from a nozzle 21 into the plasma discharge volume 26. The electrodes supply voltage to generate the plasma discharge that is shaped by plasma shaping air 19 injected from one or more injection apertures 28.

FIG. 6C illustrates a dual co-axial cylinder configuration in which the inner cylindrical (or conic shaped) electrode 68 has an smaller diameter than the outer cylindrical electrode 70. In the case of liquid hydrocarbons, it is necessary to configure the nozzle 21 to deliver a hollow spray of fuel or fuel/air mixture 16 into the plasma discharge volume 26 between the electrodes 68 and 70 to prevent deposition and coagulation of the fuel/air mixture droplets on the electrodes. The electrodes supply voltage to generate the plasma discharge that is shaped by plasma shaping air 19 injected from one or more injection apertures 28.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A plasmatron fuel converter for producing a hydrogen rich gas, comprising:
    a first electrode comprising an electrically conductive structure;
    a second electrode disposed with respect to the first electrode as to create at least two boundaries of a plasma discharge volume;
    a power supply connected to the first and second electrodes to provide voltage and current sufficient to generate a plasma discharge within the plasma discharge volume to initiate a reaction of an injected reactive mixture; and
    means for establishing a fluid flow through the plasma discharge volume;
        wherein the fluid flow continually stretches and extinguishes the plasma discharge generated within the plasma discharge volume; and
        wherein the plasma discharge is continually and substantially reestablished randomly across the plasma discharge volume.

2. The plasmatron fuel converter of claim 1 wherein generation, extinction and reestablishment of the plasma discharge produces a quasi-continuous plasma discharge that is substantially equally distributed throughout the plasma discharge volume.

3. The plasmatron fuel converter of claim 2 wherein the quasi-continuous plasma discharge initiates chemical reactions substantially throughout the plasma discharge volume.

4. The plasmatron fuel converter of claim 3 wherein the chemical reactions are partial oxidation reactions selected for operation between stoichiometric partial oxidation and full combustion.

5. The plasmatron fuel converter of claim 1 wherein the plasma discharge is reestablished after extinction in a time of less than 100 nanoseconds.

6. The plasmatron fuel converter of claim 1 further comprising an injection mechanism for injecting said injected reactive mixture into said plasma discharge volume.

7. The plasmatron fuel converter of claim 6 wherein said injection mechanism comprises:
    means for providing fuel;
    means for providing air assist to mix with said fuel and to form a fuel/oxidant mixture; and
    a nozzle for controlling injection of said fuel/oxidant mixture into said plasma discharge volume.

8. The plasmatron fuel converter of claim 6 wherein said injection mechanism and said fluid flow are adapted to provide an enlarged volumetric contact of said plasma discharge and said injected reactive mixture within said plasma discharge volume.

9. The plasmatron fuel converter of claim 1 wherein a flow direction of said injected reactive mixture is perpendicular to a flow direction of said fluid flow.

10. The plasmatron fuel converter of claim 1 wherein said injected reactive mixture and said fluid flow are the same flow.

11. The plasmatron fuel converter of claim 1 wherein the fluid flow comprises an oxidant.

12. The plasmatron fuel converter of claim 11 wherein the oxidant comprises air.

13. The plasmatron fuel converter of claim 11 wherein the oxidant comprises an exhaust gas containing free oxygen.

14. The plasmatron fuel converter of claim 1 wherein the fluid flow comprises a fuel/oxidant mixture.

15. The plasmatron fuel converter of claim 1 wherein said injected reactive mixture comprises a fuel/oxidant mixture.

16. The plasmatron fuel converter of claim 1 wherein said injected reactive mixture comprises fuel.

17. The plasmatron fuel converter of claim 1 wherein the current provided by the power supply is limited so as to prevent non-arcing-to-arc breakdown.

18. The plasmatron fuel converter of claim 1 wherein said power supply is an adjustable frequency power supply.

19. The plasmatron fuel converter of claim 18 wherein said adjustable frequency power supply is adapted to be adjusted from 100 Hz to 2 MHz.

20. The plasmatron fuel converter of claim 1 wherein said power supply provides voltage in the range of approximately 300 volts to 60 kilovolts and current in the range of approximately 10 milliamperes to 2 amperes to generate said plasma discharge within the plasma discharge volume.

21. The plasmatron fuel converter of claim 1 wherein said first electrode and said second electrode are hollow cylindrical electrodes disposed to form a channel containing the plasma discharge volume.

22. The plasmatron fuel converter of claim 1 wherein said first electrode and said second electrode are ring electrodes positioned in a vertical configuration.

23. The plasmatron fuel converter of claim 1 wherein said first electrode and said second electrode are rod electrodes positioned in a horizontal configuration.

24. The plasmatron fuel converter of claim 1 wherein said first electrode and said second electrode are cylinders positioned in a co-axial configuration.

25. The plasmatron fuel converter of claim 1 wherein the fluid flow is introduced upstream from the plasma discharge volume.

26. The plasmatron fuel converter of claim 1 wherein said fluid flow is adapted to provide an enlarged volumetric contact of said plasma discharge and said injected reactive mixture within said plasma discharge volume.

27. The plasmatron fuel converter of claim 1 further comprising:
    a reactor having a reaction extension region adapted to receive an ignited reactive mixture from said plasma discharge volume.

28. The plasmatron fuel converter of claim 27 wherein the reactor is a metallic or ceramic cylinder.

29. The plasmatron fuel converter of claim 27 wherein an interior of the reactor is covered with thermal insulation.

30. The plasmatron fuel converter of claim 27 wherein an exterior of the reactor is covered with thermal insulation.

31. The plasmatron fuel converter of claim 27 wherein the reaction extension region contains a catalytic structure.

32. The plasmatron fuel converter of claim 31 wherein the catalytic structure is a metallic or ceramic honeycomb catalytic structure.

33. The plasmatron fuel converter of claim 31 wherein the catalytic structure is coated with one or more catalyst selected from the group consisting of ruthenium, rhodium, cobalt, iron, nickel, palladium, rhenium, osmium, and platinum.

34. The plasmatron fuel converter of claim 27 wherein a turbulizer is disposed within the reaction extension region to receive and deflect the ignited reactive mixture exiting the plasma discharge volume.

35. The plasmatron fuel converter of claim 27 further comprising:
   a heat exchanger adapted to receive the hydrogen rich gas output from said reactor.

36. The plasmatron fuel converter of claim 35 wherein the heat exchanger is adapted to preheat the injected reactive mixture or said fluid flow.

37. The plasmatron fuel converter of claim 1 wherein the injected reactive mixture is selected for operation between stoichiometric partial oxidation and full oxidation.

38. The plasmatron fuel converter of claim 1 wherein an oxygen to carbon ratio of the injected reactive mixture is between 1.2 and 2.0.

39. The plasmatron fuel converter of claim 1 wherein said oxygen to carbon ratio of the reactive mixture is less than 1.2.

40. The plasmatron fuel converter of claim 1 wherein said plasmatron fuel converter operates at full combustion and wherein an output of said plasmatron fuel converter is a hot gas that is no longer hydrogen-rich.

* * * * *